United States Patent [19]

Kawaguchi et al.

[11] Patent Number: 5,308,706
[45] Date of Patent: May 3, 1994

[54] HEAT REFLECTING SANDWICH PLATE

[75] Inventors: Jun Kawaguchi, Yokohama; Tatsuya Hyodo; Takaharu Miyazaki, both of Maizuru, all of Japan

[73] Assignee: Nippon Sheet Glass Co., Ltd., Japan

[21] Appl. No.: 6,173

[22] Filed: Jan. 15, 1993

Related U.S. Application Data

[63] Continuation of Ser. No. 708,093, May 24, 1992, abandoned, which is a continuation of Ser. No. 384,559, Jul. 24, 1989, abandoned.

[30] Foreign Application Priority Data

Jul. 27, 1988 [JP] Japan ................................. 63-99449
Jul. 7, 1989 [JP] Japan ................................. 1-176725

[51] Int. Cl.⁵ ...................... B32B 15/04; B32B 17/06; B32B 17/10
[52] U.S. Cl. ................................. 428/426; 428/432; 428/437; 428/469; 428/623; 428/626; 428/630; 428/689; 428/925
[58] Field of Search ............... 428/426, 432, 437, 469, 428/623, 626, 630, 689, 925

[56] References Cited

U.S. PATENT DOCUMENTS

| | | | |
|---|---|---|---|
| 3,660,137 | 5/1972 | Furuuchi et al. | 428/432 |
| 4,017,661 | 4/1977 | Gillery | 428/412 |
| 4,160,061 | 7/1979 | Okino et al. | 428/432 |
| 4,188,452 | 2/1980 | Groth | 428/432 |
| 4,294,881 | 10/1981 | Meyer et al. | 428/334 |
| 4,337,990 | 7/1982 | Fan et al. | 350/312 |
| 4,382,995 | 5/1983 | Lin | 428/415 |
| 4,497,700 | 2/1985 | Groth et al. | 204/192.27 |
| 4,510,190 | 4/1985 | Gläser | 428/34 |
| 4,600,627 | 8/1986 | Honda et al. | 428/441 |
| 4,687,687 | 8/1987 | Terneu et al. | 428/34 |
| 4,716,086 | 12/1987 | Gillery et al. | 428/630 |
| 4,799,745 | 1/1989 | Meyer et al. | 350/1.7 |
| 4,834,857 | 5/1989 | Gillery | 204/192.27 |
| 4,948,677 | 8/1990 | Gillery | 428/432 |
| 4,965,121 | 10/1990 | Young et al. | 428/432 |
| 4,968,563 | 11/1990 | Thomas | 428/432 |

Primary Examiner—Thurman K. Page
Assistant Examiner—Amy L. Hulina
Attorney, Agent, or Firm—Woodcock Washburn Kurtz Mackiewicz & Norris

[57] ABSTRACT

Disclosed herein is a heat reflecting sandwich plate made up of a first and a second transparent plates bonded together with a transparent resin film. The first transparent plate is coated on the inside thereof with a heat reflecting film which is a laminate composed of two metal oxide layers, with a noble metal layer intervening between them. The noble metal layer has a sheet resistance of 4–10 ohms/square. The first and second metal oxide layers have thicknesses controlled such that their ratio is in the range of 1.1 to 1.6. The heat reflecting sandwich plate produces reflected rays which have a chromaticness specified by $-1 \leq a \leq 1$ and $-1 \leq b \leq 1$, where a and b denote the chromaticness indices of Hunter's color specification system, and has a visible light reflectivity lower than 10%. Because of these characteristic properties, the heat reflecting sandwich plate has high strength and safety, exhibits outstanding heat reflecting performance, and assumes almost no color and looks good despite its comparatively high visible light transmittance.

8 Claims, 1 Drawing Sheet

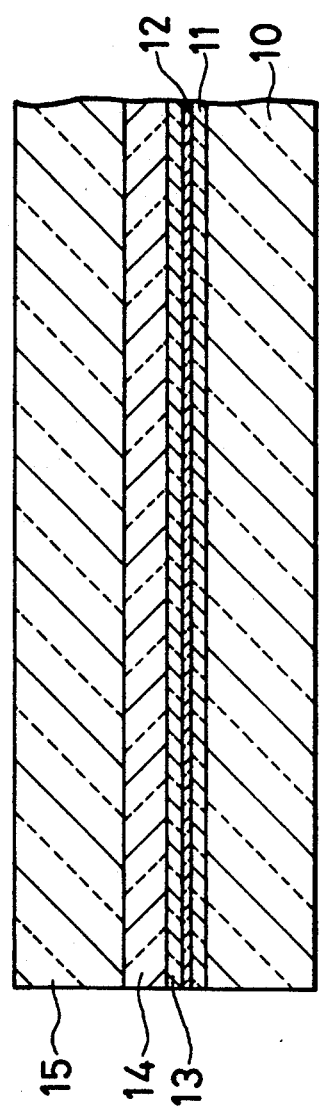

HEAT REFLECTING SANDWICH PLATE

This is a continuation of application Ser. No. 708,093, filed May 24, 1991, now abandoned, which is a continuation of Ser. No. 384,559, filed Jul. 24, 1989, now abandoned.

BACKGROUND OF THE INVENTION

1. Field of the Invention:

The present invention relates to a sandwich plate composed of a pair of transparent plates such as glass, synthetic resin or the like, and a transparent interlayer of synthetic resin, said sandwich plate being rendered capable of heat reflection. The heat reflecting sandwich plate is suitable as vehicle and building window glass.

2. Description of the Prior Art:

There has been known sandwich glass made up of a pair of glass sheets (made by, for example, float process) bonded together with an interlayer of transparent synthetic resin such as polyvinyl butyral. The sandwich glass of such multilayered structure has high strength and safety owing to the interlayer's ability to prevent the glass plates from shattering in the event of breakage.

A disadvantage of the sandwich glass used as vehicle and building window glass is that it transmits a large amount of solar radiant energy into the vehicle and building, causing the room temperature to rise unnecessarily, particularly in summer.

There is disclosed in U.S. Pat. No. 4,337,990 a heat reflecting glass prepared by forming a first metal oxide layer, a noble metal layer, and a second metal oxide layer consecutively on a glass sheet. The first and second metal oxide layers have almost the same thickness so that the three layers give rise to, by their light interference, a low reflectivity for light of wavelength 550 nm(nanometer) having a high visual sensitivity and yet give rise to a high transmittance for visible light.

The heat reflecting glass disclosed in the above-mentioned U.S. Patent gives a reflective spectrum which indicates the strong reflection in the longer (red) side and shorter (blue) side of the visible region. This spectral characteristic causes the heat reflecting glass to produce a dazzling reflected ray of purplish color for the incident rays on either sides. Because of this colored reflected rays, the heat reflecting glass as vehicle and building window glass is out of harmony with the exterior of the vehicle and building.

SUMMARY OF THE INVENTION

It is an object of the present invention to provide a heat reflecting sandwich plate which has high strength, high safety (ability to prevent shattering in the event of breakage), outstanding performance of heat reflection, and comparatively high transmittance for visible light, and yet looks good and takes on almost no color.

The present invention provides a heat reflecting sandwich plate made up of a first and a second transparent plates such as glass, synthetic resin or the like, bonded together with a transparent resin film, characterized in that the first transparent plate is coated on the inside thereof with a heat reflecting film which intervenes between the first transparent plate and the transparent resin film, said heat reflecting film being a laminate composed of a first metal oxide layer, a noble metal layer, and a second metal oxide layer formed consecutively on the inside of the first transparent plate, and the first and second metal oxide layers having thicknesses controlled such that their total thickness is 500–900 Å and the ratio of the thickness of the first metal oxide layer to the thickness of the second metal oxide layer or the ratio of the thickness of the second metal oxide layer to the thickness of the first metal oxide layer is in the range of 1.1 to 1.6, preferably 1.2 to 1.5, the noble metal layer has a sheet resistance of 4–10 ohms/square, and the heat reflecting sandwich plate produces reflected rays which have a chromaticness specified by $-1 \leq a \leq 1$ and $-1 \leq b \leq 1$, where a and b denote the chromaticness indices of Hunter's color specification system, and has a visible light reflectivity lower than 10%.

According to the present invention, the noble metal layer is required to have a sheet resistance of 4–10 ohms/square for the reason mentioned below. With a sheet resistance smaller than 4 ohms/square, the noble metal layer produces such a striking chromaticness on account of its excessively high visible light reflectance that the reflected rays from the sandwich plate has a chromaticness whose "a" and "b" are outside the range specified above. Conversely, with a sheet resistance greater than 10 ohms/square, the noble metal layer does not reflect heat rays consistently and tends to decrease in visible light transmittance on account of its oxidation. In the case where the noble metal layer is made of silver and has a sheet resistance of 4 ohms/square, it would have a thickness of 130 to 270 Å, depending on the method of preparation. With a sheet resistance of 10 ohms/square, it would have a thickness of 60 to 150 Å, depending on the method of preparation. Therefore, the noble metal layer may be 60–270 Å thick if it is made of silver or a silver alloy.

According to the present invention, the first and second transparent plates should preferably be sheet glass made by, for example, float process. They may be properly colored according to need so long as they have a visible light transmittance required. In addition, they may have any desired thickness according to applications; but the adequate thickness is in the range of 0.5 to 5 mm, preferably 1 to 3 mm.

According to the present invention, the first and second metal oxide layers have thicknesses which are controlled such that their total thickness is 500–900 Å and the ratio of the thickness of the first metal oxide layer to the thickness of the second metal oxide layer or the ratio of the thickness of the second metal oxide layer to the thickness of the first metal oxide layer is in the range of 1.1 to 1.6. These requirements are essential for the heat reflecting sandwich plate to produce reflected rays which have a chromaticness specified by $-1 \leq a \leq 1$ and $-1 \leq b \leq 1$, where a and b denote the chromaticness indices of Hunter's color specification system. Thus, the sandwich plate takes on a quiet color.

According to the present invention, the first and second metal oxide layers each may have a refractive index in the range of 1.9 to 2.1 and a thickness in the range of 190 to 690 Å.

According to the present invention, the first and second metal oxide layers each may be made of any of tin oxide, indium oxide, tin oxide-containing indium oxide (referred to as ITO hereinafter), zinc oxide, or antimony oxide. The two metal oxide layers may be made of the same oxide or different oxides. Usually, the tin oxide is stannic oxide ($SnO_2$), the indium oxide is diindium trioxide ($In_2O_3$), the zinc oxide is zinc oxide (ZnO) free of zinc suboxide, and the antimony oxide is diantimony pentoxide ($Sb_2O_5$).

According to the present invention, the noble metal layer may be made of one or more than one member selected from gold, silver, copper, palladium, and rhodium. Preferable among them is silver because of its low visible ray absorption. It is desirable that silver be used in combination with a small amount of at least one member selected from gold, copper, palladium, and rhodium, because silver alone lacks sufficient chemical resistance such as moisture resistance, alkali resistance, and arid resistance. The amount of gold and copper should preferably be less than 2% and the amount of palladium and rhodium should preferably be less than 1%, and in the case where two or more kinds of minor noble metals are used, their total amount should be less than 2%; otherwise, the minor noble metal changes the color of the noble metal layer made of silver alone, decreasing the visible light transmittance. The noble metal layer should preferably have a thickness in the range of 30 to 300 Å.

According to the present invention, the transparent resin film may be made of any material so long as it is transparent in the visible region, has almost the same refractive index as that of the transparent plate (about 1.52 in the case of sheet glass), and has good adhesion to both the transparent plates and the heat reflecting film. An example of the transparent resin film is the one made of polyvinyl alcohol resin (such as polyvinyl butyral), vinyl acetate resin (such as ethylene vinyl acetate), thermoplastic polyurethane resin, or polyvinyl chloride resin. Polyvinyl butyral film is preferable. The film thickness may be in the range of 0.05 to 0.4 mm, preferably 0.1 to 0.2 mm.

According to the present invention, the heat reflecting sandwich plate should preferably have a visible light transmittance higher than 80% and a solar radiant energy transmittance lower than 75%, so that it permits the sufficient transmission of visible light and yet cuts off a certain amount of solar radiant energy.

The heat reflecting sandwich plate of the present invention may be produced in the following manner. On the inside of the first glass plate are formed the first metal oxide layer, the noble metal layer, and the second metal oxide layer consecutively. The first glass plate, the transparent resin film (in the form of sheet), and the second glass plate are laminated one top after another. The resulting laminate is heated at 130°-180° C. under a pressure of 1-5 kg/cm$^2$, so that the transparent resin film is fusion-bonded to the second metal oxide layer on the first glass plate and also to the inside of the second glass plate. The laminate is cut to desired size and shape.

Where the heat reflecting sandwich plate of the present invention is used as vehicle and building window glass, it is usually mounted such that the first transparent plate (on which the heat reflecting film is coated) faces outside. The thus mounted heat reflecting sandwich plate reflects light on both sides, the reflected rays assuming substantially the same chromaticness. Since vehicles and buildings are usually bright outside and dark inside, the reflected light is a matter of concern when viewed from outside and the transmitted light is a matter of concern when viewed from inside. The heat reflecting sandwich plate of the present invention gives almost colorless reflected light and transmits visible light sufficiently.

The heat reflecting sandwich plate of the present invention has a high strength and is hard to break, because it is of multilayered structure composed of the first transparent plate (on which the heat reflecting film is coated), and the second transparent plate which are bonded together with the transparent resin film.

The heat reflecting sandwich plate of the present invention prevents shattering and hence secures great safety because the first and second transparent plates are bonded together with the transparent resin film, so that, when broken, the transparent plates tend to adhere to the resin film rather than fly.

According to the present invention, the heat reflecting film coated on the inside of the first transparent plate is composed of two metal oxide layers and one noble metal layer intervening between them. The two metal oxide layers have thicknesses which are controlled such that their total thickness is in the range of 500 to 900 Å, with their ratio being 1.1 to 1.6. The sandwich plate produces reflected rays which have a chromaticness specified by $-1 \leq a \leq 1$ and $-1 \leq b \leq 1$, where a and b denote the chromaticness indices of Hunter's color specification system, and has a visible light reflectivity lower than 10%. Thus, the present invention provides a heat reflecting sandwich plate which exhibits good performance of heat reflection and permits a comparatively high visible light transmittance, and yet assumes almost no color and looks good.

The above and other objects, features, and advantages of the present invention will be readily understood by the following detailed description in conjunction with the accompanying drawing.

BRIEF DESCRIPTION OF THE DRAWING

The single drawing is a partial longitudinal sectional view showing the heat reflecting sandwich plate of the present invention.

DETAILED DESCRIPTION OF THE PREFERRED EMBODIMENTS

A glass plate 10 (for example 2.1 mm thick) was coated with a first metal oxide layer (for example 238 Å thick) 11 of ITO (which is tin oxide containing indium oxide composed of 10% tin oxide and 90% indium oxide, the same shall apply hereinafter) by sputtering. The sputtering was carried out in an atmosphere composed of argon and oxygen at a pressure of, for example, 0.4 Pa (Pascal [neuton/m$^2$]), using a sintered body composed of tin oxide and indium oxide as the target. The first metal oxide layer 11 was further coated with a noble metal layer 12 of silver having a sheet resistance of 9 ohms/square by sputtering. The sputtering was carried out in an argon atmosphere at a pressure of, for example, 0.4 Pa, using silver as the target. The noble metal layer 12 was further coated with a second metal oxide layer (for example, 262 Å thick) 13 of ITO by sputtering. The sputtering was carried out in an atmosphere composed of argon and oxygen at a pressure of, for example, 0.4 Pa, using a sintered body composed of tin oxide and indium oxide as the target. On the second metal oxide layer 13 were laminated a, for example, 0.15 mm thick transparent resin film of polyvinyl butyral 14 and a, for example, 2.1 mm thick glass plate 15 on top after another. The resulting laminate was heated at, for example, 150° C. and pressed under a pressure of, for example, 3 kg/cm$^2$ so that the polyvinyl butyral film 14 was fusion-bonded to the second metal oxide layer 13 on the glass plate 10 and also to the glass plate 15. The laminated product was trimmed to desired size. Thus there was obtained a transparent heat reflecting sandwich plate as shown in the accompanying drawing.

Heat reflecting sandwich plates of the same structure as mentioned above were prepared except that ITO for the first metal oxide layer 11 was replaced by ZnO, ITO for the second metal oxide layer 13 was replaced by ZnO or $SnO_2$, and silver for the noble metal layer 12 was replaced by Ag-0.5%Cu alloy or Ag-1%Au alloy. In addition, heat reflecting sandwich plates of the same structure as mentioned above were prepared except that the thicknesses of the first and second metal oxide layers 11 and 13 were varied in the range of 200 to 540 Å and the sheet resistance of the noble metal layer 12 was varied in the range of 6 to 9 ohms/square.

Tables 1 to 12 given below show the performance of the heat reflecting sandwich plates prepared in Examples of this invention as mentioned above. Table 13 shows the performance of the heat reflecting sandwich plate prepared in Comparative Example. In tables 1 to 13, Hunter Chroma. means the chromaticness indices of Hunter's color specification system. The heat reflecting sandwich plates shown in Tables 1 to 13 have the first metal oxide layer 11, the noble metal layer 12, and the second metal oxide layer 13 which were made of the following materials.

| | Examples |
|---|---|
| Table 1 | ITO / Ag / ITO |
| Table 3 | ITO / Ag / ITO |
| Table 4 | ITO / Ag / ITO |
| Table 5 | ITO / Ag / ITO |
| Table 6 | ITO / Ag / ITO |
| Table 7 | ITO / Ag / ITO |
| Table 8 | ITO / Ag / ITO |
| Table 9 | ZnO / Ag / $SnO_2$ |
| Table 10 | ZnO / Ag / ZnO |
| Table 11 | ITO / Ag-0.5% Cu / ITO |
| Table 12 | ITO / Ag-1% Au / ITO |
| | Comparative Example |
| Table 13 | ITO / Ag / ITO |

TABLE 1

(ITO/Ag/ITO)

| Layer construction | | | | Ratio of | | | Reflect- | Transmit- | |
| --- | --- | --- | Total thick- | thicknesses | | | ance of | tance of | Transmit- |
| Thickness | Sheet re- sistance of | Thickness | ness of layers | of layers | Hunter chroma. | | visible light | visible light | tance of solar rays |
| of layer (11) (Å) | layer (12) (Ω/□) | of layer (13) (Å) | (11) and (13) (Å) | (11) and (13) (Å) | a | b | (%) | (%) | (%) |
| 238 | 9 | 262 | 500 | 1.1 | 0.9 | −0.7 | 7.9 | 83.6 | 69.9 |
| 227 | 9 | 273 | 500 | 1.2 | 0.7 | −0.5 | 7.9 | 83.5 | 69.8 |
| 217 | 9 | 283 | 500 | 1.3 | 0.7 | −0.2 | 7.9 | 83.5 | 69.8 |
| 208 | 9 | 292 | 500 | 1.4 | 0.3 | −0.2 | 7.9 | 83.5 | 69.8 |
| 200 | 9 | 300 | 500 | 1.5 | 0.7 | −0.3 | 7.9 | 83.4 | 69.8 |

TABLE 2

(ITO/Ag/ITO)

| Layer construction | | | | Ratio of | | | Reflect- | Transmit- | |
| --- | --- | --- | Total thick- | thicknesses | | | ance of | tance of | Transmit- |
| Thickness | Sheet re- sistance of | Thickness | ness of layers | of layers | Hunter chroma. | | visible light | visible light | tance of solar rays |
| of layer (11) (Å) | layer (12) (Ω/□) | of layer (13) (Å) | (11) and (13) (Å) | (11) and (13) (Å) | a | b | (%) | (%) | (%) |
| 262 | 9 | 238 | 500 | 1.1 | 0.9 | −0.7 | 8.0 | 83.6 | 69.9 |
| 272 | 9 | 228 | 500 | 1.2 | 0.7 | −0.5 | 8.2 | 83.5 | 69.8 |
| 283 | 9 | 217 | 500 | 1.3 | 0.7 | −0.4 | 8.2 | 83.5 | 69.8 |
| 293 | 9 | 207 | 500 | 1.4 | 0.6 | −0.4 | 8.3 | 83.4 | 69.8 |
| 300 | 9 | 200 | 500 | 1.5 | 0.7 | −0.6 | 8.4 | 83.4 | 69.8 |

TABLE 3

(ITO/Ag/ITO)

| Layer construction | | | | Ratio of | | | Reflect- | Transmit- | |
| --- | --- | --- | Total thick- | thicknesses | | | ance of | tance of | Transmit- |
| Thickness | Sheet re- sistance of | Thickness | ness of layers | of layers | Hunter chroma. | | visible light | visible light | tance of solar rays |
| of layer (11) (Å) | layer (12) (Ω/□) | of layer (13) (Å) | (11) and (13) (Å) | (11) and (13) (Å) | a | b | (%) | (%) | (%) |
| 429 | 9 | 471 | 900 | 1.1 | 0.1 | −0.9 | 7.8 | 84.7 | 72.5 |
| 409 | 9 | 491 | 900 | 1.2 | 0.0 | −0.7 | 7.8 | 84.6 | 72.4 |
| 391 | 9 | 509 | 900 | 1.3 | 0.0 | −0.7 | 8.0 | 84.4 | 72.3 |
| 375 | 9 | 525 | 900 | 1.4 | 0.0 | −0.7 | 8.0 | 84.4 | 72.3 |
| 360 | 9 | 540 | 900 | 1.5 | −0.1 | −0.7 | 8.3 | 84.4 | 72.3 |

TABLE 4

(ITO/Ag/ITO)

| Layer construction | | | | Ratio of | | | Reflect- | Transmit- | |
| --- | --- | --- | Total thick- | thicknesses | | | ance of | tance of | Transmit- |
| Thickness | Sheet re- sistance of | Thickness | ness of layers | of layers | Hunter chroma. | | visible light | visible light | tance of solar rays |
| of layer (11) (Å) | layer (12) (Ω/□) | of layer (13) (Å) | (11) and (13) (Å) | (11) and (13) (Å) | a | b | (%) | (%) | (%) |
| 471 | 9 | 429 | 900 | 1.1 | 0.1 | −0.8 | 8.0 | 84.7 | 72.5 |
| 410 | 9 | 490 | 900 | 1.2 | 0.1 | −0.4 | 8.2 | 84.5 | 72.3 |
| 509 | 9 | 391 | 900 | 1.3 | 0.0 | −0.4 | 8.5 | 84.4 | 72.3 |

TABLE 4-continued (ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 376 | 9 | 524 | 900 | 1.4 | 0.0 | −0.1 | 8.6 | 84.0 | 72.1 |
| 540 | 9 | 360 | 900 | 1.5 | −0.2 | −0.1 | 9.0 | 83.9 | 72.1 |

TABLE 5

(ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 321 | 6 | 354 | 675 | 1.1 | 0.9 | 0.7 | 8.1 | 82.5 | 66.8 |
| 307 | 6 | 368 | 675 | 1.2 | 0.8 | 0.6 | 8.1 | 82.3 | 66.7 |
| 293 | 6 | 382 | 675 | 1.3 | 0.8 | 0.6 | 8.2 | 82.3 | 66.6 |
| 281 | 6 | 394 | 675 | 1.4 | 0.6 | 0.4 | 8.2 | 82.2 | 66.6 |
| 270 | 6 | 405 | 675 | 1.5 | 0.7 | 0.5 | 8.4 | 82.0 | 66.5 |

TABLE 6

(ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 353 | 6 | 322 | 675 | 1.1 | 0.9 | 0.7 | 8.4 | 82.5 | 66.8 |
| 368 | 6 | 307 | 675 | 1.2 | 0.8 | 0.6 | 8.5 | 82.3 | 66.7 |
| 380 | 6 | 295 | 675 | 1.3 | 0.8 | 0.6 | 8.7 | 82.3 | 66.6 |
| 395 | 6 | 280 | 675 | 1.4 | 0.6 | 0.4 | 8.9 | 82.2 | 66.6 |
| 406 | 6 | 269 | 675 | 1.5 | 0.7 | 0.4 | 9.3 | 82.0 | 66.5 |

TABLE 7

(ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 417 | 6 | 458 | 875 | 1.1 | 0.8 | −1.0 | 8.2 | 83.0 | 68.2 |
| 398 | 6 | 477 | 875 | 1.2 | 0.6 | −0.7 | 8.3 | 82.7 | 68.0 |
| 380 | 6 | 495 | 875 | 1.3 | 0.6 | −0.7 | 8.4 | 82.7 | 67.9 |
| 365 | 6 | 510 | 875 | 1.4 | 0.3 | −0.6 | 8.5 | 82.5 | 67.8 |
| 350 | 6 | 525 | 875 | 1.5 | 0.4 | −0.7 | 8.8 | 82.1 | 67.6 |

TABLE 8

(ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 458 | 6 | 417 | 875 | 1.1 | 0.8 | −0.9 | 8.4 | 83.0 | 68.2 |
| 475 | 6 | 400 | 875 | 1.2 | 0.6 | −0.6 | 8.6 | 82.9 | 68.0 |
| 495 | 6 | 382 | 875 | 1.3 | 0.5 | −0.5 | 9.0 | 82.7 | 67.9 |
| 510 | 6 | 365 | 875 | 1.4 | 0.2 | −0.2 | 9.2 | 82.5 | 67.8 |
| 525 | 6 | 350 | 875 | 1.5 | 0.3 | −0.1 | 9.7 | 82.1 | 67.6 |

TABLE 9

(ZnO/Ag/SnO$_2$)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 238 | 8 | 262 | 500 | 1.1 | 0.9 | −0.9 | 7.9 | 83.0 | 67.7 |
| 227 | 8 | 273 | 500 | 1.2 | 0.7 | −0.2 | 8.0 | 83.6 | 67.5 |
| 217 | 8 | 283 | 500 | 1.3 | 0.6 | −0.2 | 7.9 | 83.7 | 67.3 |
| 208 | 8 | 292 | 500 | 1.4 | 0.7 | −0.3 | 8.0 | 83.6 | 67.4 |
| 200 | 8 | 300 | 500 | 1.5 | 0.8 | −0.3 | 8.0 | 83.6 | 67.5 |

TABLE 10

(ZnO/Ag/ZnO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 240 | 7 | 260 | 500 | 1.1 | 0.9 | −0.8 | 8.0 | 83.6 | 67.9 |
| 230 | 7 | 270 | 500 | 1.2 | 0.7 | −0.4 | 8.0 | 83.6 | 67.8 |
| 220 | 7 | 280 | 500 | 1.3 | 0.7 | −0.2 | 8.2 | 83.7 | 67.8 |
| 210 | 7 | 290 | 500 | 1.4 | 0.6 | −0.3 | 8.3 | 83.8 | 67.7 |
| 200 | 7 | 230 | 500 | 1.5 | 0.8 | −0.4 | 8.5 | 83.8 | 67.6 |

TABLE 11

(ITO/Ag-0.5% Cu/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 286 | 9 | 314 | 600 | 1.1 | 0.8 | −0.5 | 8.0 | 82.6 | 68.5 |
| 272 | 9 | 328 | 600 | 1.2 | 0.7 | −0.3 | 8.0 | 82.5 | 68.5 |
| 261 | 9 | 339 | 600 | 1.3 | 0.5 | −0.3 | 8.0 | 82.5 | 68.5 |
| 250 | 9 | 350 | 600 | 1.4 | 0.6 | −0.3 | 8.1 | 82.4 | 68.4 |
| 240 | 9 | 360 | 600 | 1.5 | 0.7 | −0.4 | 8.2 | 82.4 | 68.4 |

TABLE 12

(ITO/Ag-1%Au/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 290 | 9 | 310 | 600 | 1.1 | 0.9 | −0.8 | 8.0 | 83.2 | 68.6 |
| 270 | 9 | 330 | 600 | 1.2 | 0.6 | −0.5 | 8.1 | 83.1 | 68.5 |
| 262 | 9 | 338 | 600 | 1.3 | 0.5 | −0.5 | 8.2 | 82.6 | 68.5 |
| 250 | 9 | 350 | 600 | 1.4 | 0.2 | −0.5 | 8.2 | 82.6 | 68.4 |
| 240 | 9 | 360 | 600 | 1.5 | 0.3 | −0.5 | 8.2 | 82.6 | 68.4 |

TABLE 13

(comparative example - ITO/Ag/ITO)

| Layer construction | | | Total thickness of layers (11) and (13) (Å) | Ratio of thicknesses of layers (11) and (13) (Å) | Hunter chroma. | | Reflectance of visible light (%) | Transmittance of visible light (%) | Transmittance of solar rays (%) |
|---|---|---|---|---|---|---|---|---|---|
| Thickness of layer (11) (Å) | Sheet resistance of layer (12) (Ω/□) | Thickness of layer (13) (Å) | | | a | b | | | |
| 450 | 9 | 450 | 900 | 1.0 | 1.1 | −1.2 | 8.3 | 83.1 | 68.2 |

Tables 1 to 13 indicate the following.

(1) In Comparative Example shown in Table 13, the heat reflecting sandwich plate gives the Hunter chromaticness "a" and "b" whose absolute values are greater than 1, because the first metal oxide layer (11) and the second metal oxide layer (13) have such thicknesses that their ratio is 1.0.

(2) In Examples of this invention shown in Table 1 to 12, the heat reflecting sandwich plates give the Hunter chromaticness "a" and "b" whose absolute values are smaller than 1. In the case where the ratio of the thicknesses of the first and second metal oxide layers 11 and 13 is in the range of 1.2 to 1.5, the heat reflecting sandwich plate gives the Hunter chromaticness "a" and "b" whose absolute value are sufficiently smaller than 1, compared with the case in which the ratio is 1.1.

Therefore, the heat reflecting sandwich plate in Comparative Example shown in Table 13 gives dazzling reflected light of purplish color, as mentioned above as prior art, whereas those in Examples of this invention shown in Tables 1 to 12 give almost colorless reflected light and hence look good.

Having described illustrative embodiments of the invention with reference to the accompanying drawing, it is to be understood that the invention is not limited to such precise embodiments, and that various changes and modifications may be effected therein by one skilled in the art without departing from the scope and spirit of the invention as defined in the appended claims.

What is claimed is:

1. A heat reflecting sandwich plate, for use in a vehicle, consisting of a first and a second transparent plates bonded together with a transparent resin film and a heat reflecting film, characterized in that the first transparent plate is coated on the inside thereof with said heat reflecting film which intervenes between the first transparent plate and the transparent resin film, said heat reflecting film being a laminate consisting of a first metal oxide single-layer structure, a noble metal layer, and a second metal oxide single-layer structure formed consecutively on the inside of the first transparent plate, said first and second metal oxide layers each being made of any of tin oxide, indium oxide, tin oxide containing indium oxide, zinc oxide or antimony oxide, said first and second metal oxide layers each having a thickness in the range of 190 to 690 Å and each having a refractive index in the range of 1.9 to 2.1, and the first and second metal oxide layers having thicknesses controlled such that their total thickness is 500–900 Å and the ratio of the thickness of the first metal oxide layer to the thickness of the second metal oxide layer or the ratio of the thickness of the second metal oxide layer to the thickness of the first metal oxide layer is in the range of 1.1 to 1.6, the noble metal layer has a sheet resistance of 4–10 ohms/square and is made of one or more than one member selected from gold, silver, copper, palladium and rhodium, and the heat reflecting sandwich plate produces reflected rays which have a chromaticness specified by $-1 \leq a \leq 1$ and $-1 \leq b \leq 1$, where a and b denote the chromaticness indices of Hunter's color specification system, and having a visible light reflectivity lower than 10%.

2. A heat reflecting sandwich plate as claimed in claim 1, wherein the first and second transparent plates are sheet glass.

3. A heat reflecting sandwich plate as claimed in claim 2, wherein the ratio of the thickness of the first metal oxide layer to the thickness of the second metal oxide layer or the ratio of the thickness of the second metal oxide layer to the thickness of the first metal oxide layer is in the range of 1.2 to 1.5.

4. A heat reflecting sandwich plate as claimed in claim 3, wherein the noble metal layer is made of silver as the major constituent and a small amount of at least one member selected from gold, copper, palladium, and rhodium.

5. A heat reflecting sandwich plate as claimed in claim 3, wherein the noble metal layer is made of silver.

6. A heat reflecting sandwich plate as claimed in claim 3, wherein the transparent resin film is made of polyvinyl butyral.

7. A heat reflecting sandwich plate as claimed in any of claims 1, 2, 3, 4, 5, 6, 7, 8, or 9, which has a visible light transmittance higher than 80% and a solar radiant energy transmittance lower than 75%.

8. A heat reflecting sandwich plate consisting of a first and a second transparent plates bonded together with a transparent resin film and a heat reflecting film, characterized in that:

the first transparent plate is coated on the inside thereof with said heat reflecting film which intervenes between the first transparent plate and the transparent resin film, said heat reflecting film being a laminate consisting of a first metal oxide single-layer structure, a noble metal layer, and a second metal oxide single-layer structure formed consecutively on the inside of the first transparent plate, said first and second metal oxide layers each being made of any of tin oxide, indium oxide, tin oxide containing indium oxide, zinc oxide or antimony oxide and said first and second metal oxide layers each having a thickness in the range of 190 to 690 Å, the first and second metal oxide layers have thicknesses controlled such that their total thickness is 500–900 Å and the ratio of the thickness of the first metal oxide layer to the thickness of the second metal oxide layer or the ratio of the thickness of the second metal oxide layer to the thickness of the first metal oxide layer is in the range of 1.2 to 1.5, the first and second metal oxide layers each have a refractive index in the range of 1.9 to 2.1, the noble metal layer has a sheet resistance of 4–10 ohms/square, and the heat reflecting sandwich plate produces reflected rays which have a chromaticness specified by $-1 \leq a \leq 1$ and $-1 \leq b \leq 1$, where a and b denote the chromaticness indices of Hunter's color specification system, and having a visible light reflectivity lower than 10%.

* * * * *